April 20, 1948.　　　C. O. ROTHWEILER　　　2,440,211
LEVELING DEVICE
Filed April 19, 1946

*INVENTOR.*
CHARLES O. ROTHWEILER
BY
*ATTORNEY*

Patented Apr. 20, 1948

2,440,211

UNITED STATES PATENT OFFICE 2,440,211

LEVELING DEVICE

Charles O. Rothweiler, Milwaukee, Wis.

Application April 19, 1946, Serial No. 663,416

2 Claims. (Cl. 248—180)

My invention relates to leveling devices, and more particularly to a type of device that is employed to level a transit or the like on a tripod mounting.

The object of my invention is to provide a device of the character described that permits a resilient mounting means to be totally enclosed for protection against dust or foreign matter.

Another object of my invention is to provide resilient means to take up any variation or play in the adjustment feature.

A still further object of my invention is to provide such a device that may be constructed with a combination of simple parts that may be easily assembled and replaced.

Still another object of my invention is to guard the adjustment screw from outside contact and provide a means that is readily accessible for adjustment.

Figure 1:
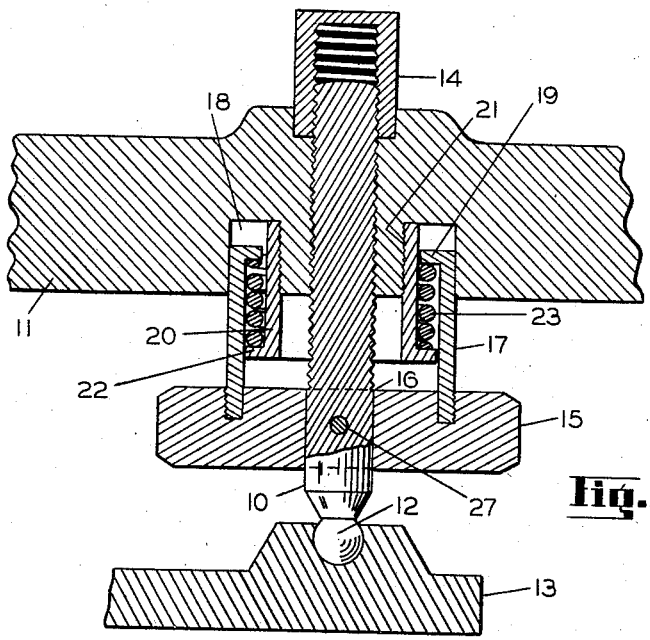
Figure 2:
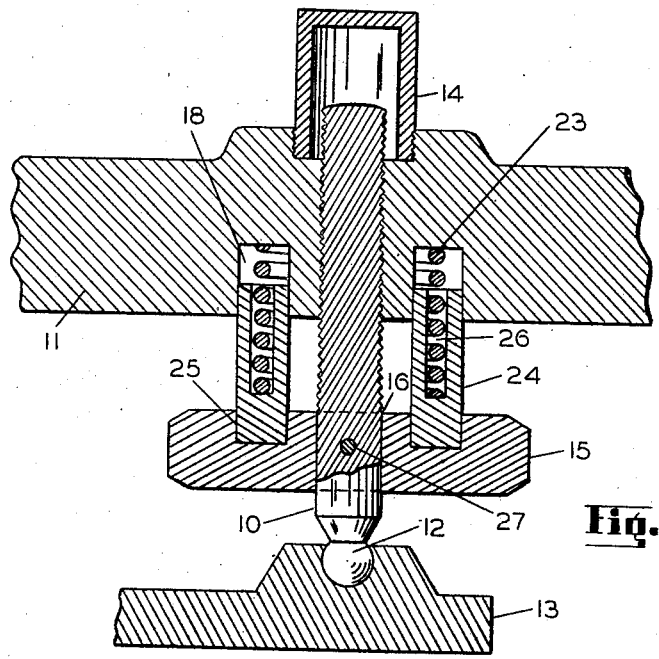

Other and further objects of my invention will become more apparent as the description proceeds, when taken in conjunction with the drawings in which:

Figure 1 is a fragmentary, cross-sectional view of the assembled device showing the resilient means encased in two telescopically assembled ferrules, and Figure 2 is a similar view of the device in which the resilient means is disposed within a single ferrule acting as a guard.

Similar characters of reference indicate corresponding parts throughout the several views, and referring now to the same, the character 10 shows an adjustment screw threadedly engaging the body of the device being leveled shown as 11. The extreme lower end of the screw 10 is provided with a spherical contact point 12 engaging the base 13 which may be the top plate of a tripod or the like.

There is a dust cap 14 shown threadedly inserted into the body 11 over the end of the screw 10 for protection of the screw.

The adjustment nut 15 rigidly engages the screw 10 at 16 and in Figure 1 is shown supporting an outer ferrule 17 which extends into a recess 18 in the bottom of the body portion 11. This outer ferrule 17 has an inwardly extending flange 19, which slidably engages the outer wall of an inner ferrule 20 which is attached to the inner wall of the recess 18 at 21, and is provided with an outwardly extending flange 22 engaging the inner wall of the outer ferrule 17. A resilient member 23 is shown inserted between the inner wall of the outer ferrule 17 and the outer wall of the inner ferrule 20 and is held in direct contact with the flanges 19 and 22. As the adjustment nut 15 and screw 10 is revolved, it will either expand or contract the resilient member 23, and the outer ferrule 17 will be caused to slide inward or outward in the recess 18 of the body 11.

In Figure 2, I show a similar arrangement with but a single ferrule 24 attached to the nut 15 at 25 and provided with an annular recess 26 into which the resilient member 23 is disposed. The resilient member 23 in Figure 2 contacts the bottom of the recess 26 and the bottom of the recess 18, and functions similarly when the adjustment nut 15 is turned.

It is manifest to anyone familiar with the art that the device as described lends itself very readily to the purpose for which it is intended. It provides a means of adjusting the distance between the base 13 and the body 10 by revolving the nut 15, which may be integrally formed with the screw 10 or may be attached in any manner such as the pin 27. The ferrules act as a covering for the screw threads on the screw 10 at any position.

In the chosen embodiments of my invention there are many features not heretofore disclosed in the prior art, and although I have attempted to show its operativeness in a specific manner, I am fully cognizant of the fact that there are many changes that may be made in the form and configuration of the component parts constituting the device without in any way effecting its operativeness, and I reserve the right to make such changes as I may deem convenient and necessary without departing from the spirit of my invention or the scope of the appended claims.

Having thus described my invention, what I claim and desire to secure by Letters Patent in the United States is:

1. A leveling device of the character described in combination with a base and a device to be leveled, said device comprising an adjustment screw threadedly engaging the device to be leveled, a projecting member extending outward from said screw, said screw pivotally engaging said base, a downwardly disposed cylindrical sleeve having an inwardly projecting flange, said sleeve attached to the lower face of the device to be leveled, an upwardly extending cylindrical sleeve having an outwardly projecting flange, said sleeve attached to the outwardly extending element on said screw, said sleeves surrounding the exposed portion of said adjustment screw and telescopically engaging one another and a spring member disposed between said sleeves and contacting the flanges thereof.

2. A leveling device of the character described in combination with a base and a device to be leveled, said device comprising an adjustable screw threadedly engaging the device to be leveled, a projecting member extending outward from and integrally formed with said screw, said screw pivotally engaging said base, a downwardly disposed cylindrical sleeve inserted at its upper end into the bottom of the device to be leveled and having an outwardly projecting annular flange at its lower edge, an upwardly extending cylindrical sleeve attached at its lower end to the projecting member on said screw and having an inwardly projecting annular flange at its upper end, said sleeves arranged for telescopic engagement with one another, a resilient member surrounding the outer periphery of said upper sleeve disposed between both of said sleeves, said resilient member engaging the flanges of said sleeve at its upper and lower ends.

CHARLES O. ROTHWEILER.

REFERENCES CITED

The following references are of record in the file of this patent:

UNITED STATES PATENTS

| Number | Name | Date |
|---|---|---|
| 943,170 | Sherwood | Dec. 21, 1909 |
| 2,132,170 | Langsner | Oct. 4, 1938 |